(12) United States Patent
Mital et al.

(10) Patent No.: US 7,873,591 B2
(45) Date of Patent: *Jan. 18, 2011

(54) USER-INTERFACE ARCHITECTURE FOR MANIPULATING BUSINESS MODELS

(75) Inventors: Vijay Mital, Sammamish, WA (US); Andrew Robert Miller, Issaquah, WA (US); Erik Jon Rucker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/670,815

(22) Filed: Feb. 2, 2007

(65) Prior Publication Data

US 2008/0189235 A1    Aug. 7, 2008

(51) Int. Cl.
G06F 9/44       (2006.01)
(52) U.S. Cl. ...................................................... 706/52
(58) Field of Classification Search ................... 706/52
See application file for complete search history.

(56) References Cited

U.S. PATENT DOCUMENTS

| | | | |
|---|---|---|---|
| 5,682,545 | A | 10/1997 | Kawasaki |
| 5,969,976 | A | 10/1999 | Kawasaki |
| 5,991,545 | A | 11/1999 | Kawasaki |
| 6,122,724 | A | 9/2000 | Kawasaki |
| 6,205,535 | B1 | 3/2001 | Kawasaki |
| 6,253,308 | B1 | 6/2001 | Kawasaki |
| 6,272,620 | B1 | 8/2001 | Kawasaki |
| 6,343,357 | B1 | 1/2002 | Kawasaki |
| 6,421,664 | B1 | 7/2002 | Groeschel |
| 6,848,110 | B2 | 1/2005 | Salmon |
| 6,996,700 | B2 | 2/2006 | Kawasaki |
| 7,599,901 | B2 * | 10/2009 | Mital et al. .................... 706/46 |
| 2008/0140601 | A1 | 6/2008 | Mital |

OTHER PUBLICATIONS

Development of a GPS codeless receiver for ionospheric calibration and time transfer Chang Bok Lee; Dong Doo Lee; Nak Sam Chung; Ik Soo Chang; Kawai, E.; Takahashi, F.; Instrumentation and Measurement, IEEE Transactions on vol. 42, Issue 2, Apr. 1993 pp. 494-497 Digital Object Identifier 10.1109/19.278610.

Ionospheric models and measurements for common-view time transfer Weiss, M.; Zhang, V.; Jensen, M.; Powers, E.; Klepczynski, W.; Lewandowski, W.; Frequency Control Symposium and PDA Exhibition, 2002. IEEE International May 29-31, 2002 pp. 517-521 Digital Object Identifier 10.11 09/FREQ.2002.1 075938.

(Continued)

*Primary Examiner*—Michael Holmes
(74) *Attorney, Agent, or Firm*—Workman Nydegger

(57) ABSTRACT

The present invention extends to methods, systems, and computer program products of user-interface architecture for manipulating business models. Embodiments of the invention facilitate efficient generation and extension of business related software applications, including commingled data-centric applications that represent both data elements and business logic in metadata. Modules of the user-interface architecture permit users to enter commands through common metaphors and wizards that abstract underlying (and more complex) modeling commands and data formats from users. The user-interface architecture can automatically search for existing models to provide and extend business related functionality.

26 Claims, 12 Drawing Sheets

OTHER PUBLICATIONS

An application of GPS dual frequency codeless receiver for ionospheric delay to single frequency VLBI observationI Imae, M.; Kondo, T.; Amagai, J.; Kaneko, A.; Miki, C.; Precision Electromagnetic Measurements, 1990. CPEM '90 Digest., Conference on Jun. 11-14, 1990 pp. 13-14 Digital Object Identifier 10.11 09/CPEM.1990.1 09902.

Long term and long distance GPS time transfer corrected by measured ionospheric delay Imae, M.; Kawai, E.; Aida, M.; Instrumentation and Measurement, IEEE Transactions on vol. 42, Issue 2, Apr. 1993 pp. 490-493 Digital Object Identifier 10.1109/19.278609.

GPS time interval and state measurement for PARCS Harris, I.; Sien Wu; Bertiger, W.; Frequency control symposium and pda exhibition jointly with the 17th european frequency and time forum, 2003. proceedings of the 2003 ieee international May 4-8, 2003 pp. 185-190 Digital Object Identifier 10.11 09/FREQ.2003.1275085.

Small-sized low-loss reflector filters utilizing reflection of Bleustein-Gulyaev-Shimizu and shear horizontal waves at free edges of substrate Kadota, M.; Ago, J.; Horiuchi, H.; Morii, H.; Ultrasonics Symposium, 1999. Proceedings. 1999 IEEE vol. 1, Oct. 17-20, 1999 pp. 55-59 vol. 1 Digital Object Identifier 10.11 09/UL TSYM.1999. 849355.

An application of GPS dual frequency codeless receiver for ionospheric delay to single frequenc band VLBI observation Inae, M.; Kondo, T.; Jun Amagai; Kaneko, A.; Miki, C.; Instrumentation and Measurement, IEEE Transactions on vol. 40, Issue 2, Apr. 1991 pp. 208-211 Digital Object Identifier 10.11 09/TIM.1990.1 032917.

Improving the NIST Ionospheric Measurement System [for international time transfer] Weiss, M.A.; Jefferts, S.; Gaudron, L.; European Frequency and Time Forum, 1996. EFTF 96., Tenth (IEE Conf. Publ. 418) Mar. 5-7, 1996 pp. 399-404.

Office Action dated Jan. 29, 2009 cited in U.S. Appl. No. 11/567,630.

Notice of Allowance dated Jun. 22, 2009 cited in U.S. Appl. No. 11/567,630.

* cited by examiner

USER-INTERFACE ARCHITECTURE FOR MANIPULATING BUSINESS MODELS

CROSS-REFERENCE TO RELATED APPLICATIONS

Not Applicable.

BACKGROUND

Background and Relevant Art

Computer systems and related technology affect many aspects of daily life in society. Computer systems commonly perform a great variety of tasks (e.g., word processing, scheduling, database management, etc.) that aid in work and business productivity. Such tasks are generally accomplished by processing functions within software applications.

Generally, software application developers design software applications to provide a certain type of functionality. For example, some applications are tailored to word processing; other applications are tailored to data management. Often, users of such software applications desire to tailor the functionality of the application to their specific needs. For example, a user of a data management application may desire to add form processing functionality that was not included in the original application. Such a user could, optionally, pay for a systems integrator to come to the user's office and reconfigure or extend the application to include the desired functionality. Alternatively, if the user's company was large enough to have an IT department, the user could ask his or her IT manager to code in the additional functionality. This may, of course, require a great deal of time from an already busy IT manager. As a last option, the user may opt to write the extension themselves, assuming the user has sufficient knowledge and available time to dedicate to such a task.

In addition to the resource requirements, allowing users to create their own application extensions can be problematic. Many users have neither the time nor the savvy to write a fully functionally application extension. Furthermore, once completed, the extension may only be configured to work on that particular user's computer system. This creates portability problems if other users want to use the extension. For these reasons, many software developers have attempted to allow users to modify their applications without having to write code.

To accomplish this, the developer can do at least one of two things: 1) implement a code generator, where a user inputs or selects a set of rules to be followed when certain actions are performed and the code generator generates the corresponding code for the application extension, or 2) implement a model engine approach where a model of the extension is turned into an object tree such that each object corresponds to the model and the model engine is able to execute the object tree.

The first approach (code generation) has several limitations. For example, it may be difficult to determine which portion of generated code relates to which part of the model. Thus, if a user wanted to use only part of the extension's functionality, it may be difficult to determine which portion to use. Furthermore, when changes are made to the model, the code for the entire extension has to be regenerated which may introduce undesirable processing delays. The second approach (model engine), although widely implemented, is still of limited use. Generally, model engines are only used for relatively simple things such as modeling workflows and corporate business policies. Providing users with the ability to extend and modify applications without using code has proved to be a difficult task.

BRIEF SUMMARY

The present invention extends to methods, systems, and computer program products of a user-interface architecture for manipulating business models. In some embodiments, a user-interface architecture is used to create a commingled data-centric application. The user-interface architecture receives user-entered data commands for creating a data model including one or more data fields and any appropriate relationships between fields or groups of fields. The user-interface architecture receives user-entered rule commands indicating a business logic rule is to be associated with one or more selected data fields and/or relationships among the one or more data fields and relationships. The user-interface architecture converts the user-entered rule command into a meta-data format that can be associated with the one or more selected data fields and/or relationships in a commingled data-centric application. Thus, the user-interface architecture abstracts the meta-data format from the user and thereby relieves the user from having to know the meta-data format. The user-interface architecture associates the meta-data format of the business logic rule with the one or more selected data fields and/or relationships to commingle the data model with the business logic rule within a commingled data-centric application.

In other embodiments, a user-interface architecture is used to create a business related software application. The user-interface architecture receives user-entered commands for creating a new model, including user-entered commands for creating one or more data fields and appropriate relationships. Existing data models are searched for any relevant models having at least a specified level of commonality with the one or more data fields and/or relationships. The user-interface architecture identifies one or more relevant models having at least the specified level of commonality with the one or more data fields and/or relationships.

The user-interface architecture presents a list of the identified one or more relevant models at the display device. The user-interface architecture receives a user-entered selection selecting one of the relevant models. The user-interface architecture automatically adds one or more additional fields and/or appropriate relationships from the selected relevant model to the new model to automatically provide the user with the functionality of an existing business related software application. Thus, the user is relieved from having to manually create the functionality.

In additional embodiments, a user-interface architecture is used to extend a business related software application. The user-interface architecture accesses a current model for a business related software application. The model is configured to provide a first business related function.

The user-interface architecture receives user-entered criteria indicative of a desire to extend the functionality of the business related software application by adding a further second business related function to the business related software application. Existing models are searched for any relevant models having at least a specified level of commonality with the received criteria. The user-interface architecture identifies one or more relevant models having at least the specified level of commonality with the received criteria. The identified relevant models have an increased likelihood of being configured to provide the second business related function relative to other unidentified data models accessible to the user-interface architecture.

The user-interface architecture presents a list of the identified one or more relevant models at the display device. The user-interface architecture receives a user-entered selection selecting one of the relevant models. The user-interface architecture receives a user-entered connection command indicating how the selected relevant model is to be connected to the current model to add the second business related function to the business related software application. The user-interface architecture connects the selected relevant model to the current model in accordance with the user-entered connection commands to add the second business related function to the business related software application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
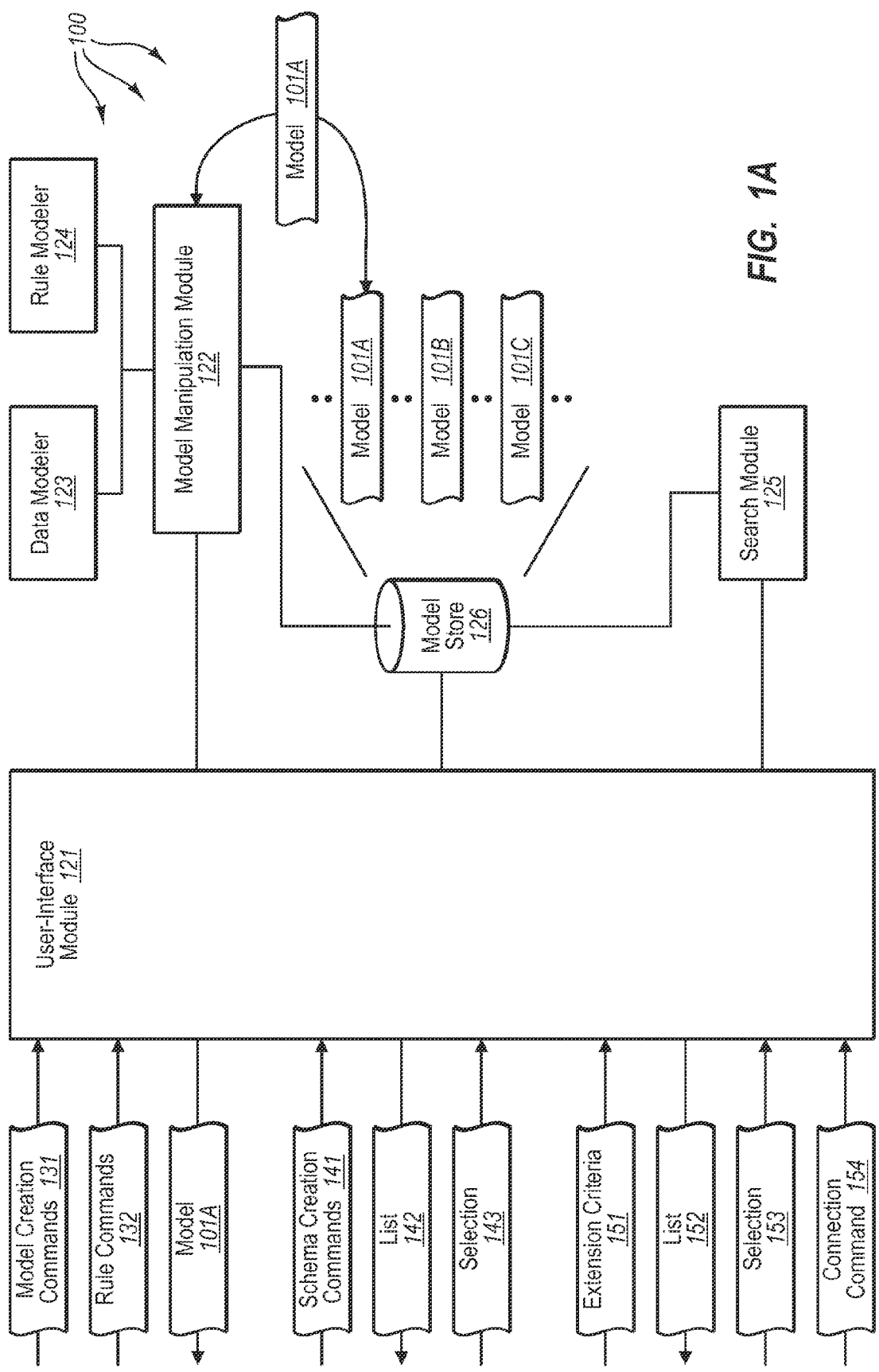
FIG. 1A illustrates an example computer user-interface architecture that facilitates manipulating business models.

The present invention extends to methods, systems, and computer program products of a user-interface architecture for manipulating business models. In some embodiments, a user-interface architecture is used to create a commingled data-centric application. The user-interface architecture receives user-entered data commands for creating a data model including one or more data fields and any appropriate relationships between fields or groups of fields. The user-interface architecture receives user-entered rule commands indicating a business logic rule is to be associated with one or more selected data fields and/or relationships among the one or more data fields and relationships. The user-interface architecture converts the user-entered rule command into a meta-data format that can be associated with the one or more selected data fields and/or relationships in a commingled data-centric application. Thus, the user-interface architecture abstracts the meta-data format from the user and thereby relieves the user from having to know the meta-data format. The user-interface architecture associates the meta-data format of the business logic rule with the one or more selected data fields and/or relationships to commingle the data model with the business logic rule within a commingled data-centric application.

In other embodiments, a user-interface architecture is used to create a business related software application. The user-interface architecture receives user-entered commands for creating a new model, including user-entered commands for creating one or more data fields and appropriate relationships. Existing data models are searched for any relevant models having at least a specified level of commonality with the one or more data fields and/or relationships. The user-interface architecture identifies one or more relevant models having at least the specified level of commonality with the one or more data fields and/or relationships.

The user-interface architecture presents a list of the identified one or more relevant models at the display device. The user-interface architecture receives a user-entered selection selecting one of the relevant models. The user-interface architecture automatically adds one or more additional fields and/or appropriate relationships from the selected relevant model to the new model to automatically provide the user with the functionality of an existing business related software application. Thus, the user is relieved from having to manually create the functionality.

In additional embodiments, a user-interface architecture is used to extend a business related software application. The user-interface architecture accesses a current model for a business related software application. The model is configured to provide a first business related function.

The user-interface architecture receives user-entered criteria indicative of a desire to extend the functionality of the business related software application by adding a further second business related function to the business related software application. Existing models are searched for any relevant models having at least a specified level of commonality with the received criteria. The user-interface architecture identifies one or more relevant models having at least the specified level of commonality with the received criteria. The identified relevant models have an increased likelihood of being configured to provide the second business related function relative to other unidentified data models accessible to the user-interface architecture.

The user-interface architecture presents a list of the identified one or more relevant models at the display device. The user-interface architecture receives a user-entered selection selecting one of the relevant models. The user-interface architecture receives a user-entered connection command indicating how the selected relevant model is to be connected to the current model to add the second business related function to the business related software application. The user-interface architecture connects the selected relevant model to the current model in accordance with the user-entered connection commands to add the second business related function to the business related software application.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer user-interface architecture 100 that facilitates manipulating business models. As depicted, computer user-interface architecture 100 includes user-interface module 121, model manipulation module 122, data modeler 123, rule modeler 124, search module 125, and model store 126.

Generally, user-interface module 121 can provide a (e.g., graphical) user-interface to a user for manipulating models stored in model store 126. User-interface module 121 is configured to receive input data from input devices (e.g., keyboard, mouse, touch surface, etc.) connect to user-interface architecture 100. Input can include commands for creating, editing, deleting, modifying, selecting, connecting, extending, and searching for data models, data schemas, and business related software application functionality present in the models stored in model store 126. For example user-interface module 121 can receive user input for creating, manipulating, etc, any of the models 101A, 101B, 101C, etc.

User-interface module 121 is also configured to provide output data to output devices (e.g., a video display device, speakers, printers, etc.) connected to user-interface architecture 100. Output data can include data models, data schemas, lists of models, as well as other results responsive to received input data.

In response to receiving input data, user-interface module 121 can identify other modules that are to receive and process the input data. For example, creating, editing, deleting, modifying, selecting, connecting, and extending commands for a specified model can be transferred to model manipulation module 122. User-interface module 121 can transfer various search criteria to search module 125. User-interface module 121 can also filer portions of received input data directed to one module for transfer to another module. For example, user-interface module 121 can identify properties (e.g., field names) included in data schema creation input and transfer those identified properties to search module 125.

User-interface 121 can be further configured to receive input data using common metaphors more likely to be known to a user, such as, for example, commands and syntax of commercially available software applications. User-interface 121 can transfer received input to other modules that in turn convert, translate, etc., the input data into metadata or other appropriate data formats of models representing business related functionality. User-interface 121 can also be configured to receive output data and present it using the common metaphors.

Model manipulation module 122 is configured to implement user-entered commands for creating, editing, deleting, modifying, selecting, connecting, and extending models, schemas, and business related application functionality. User-interface 121 can present an interface for receiving input data in format that is more familiar to a user. For example, user-interface 121 can present a user-interface common to known spreadsheet or database application. User-interface 121 can receive input data in the more familiar format and then transfer the input data to model manipulation module 122. Model manipulation model 122 can translate, modify, convert, etc. the input data into an appropriate format for use with models stored in model store 126. Accordingly, user-interface module 121 abstracts the underlying (and potentially more complex) modeling commands and data formats for manipulating models (e.g., stored in model store 126) from the user.

Search model 125 is configured to receive search criteria and return a list of models that have a specified level of commonality with the search criteria. For example, search module 125 can receive search criteria from user-interface module 121. Search module 125 can search model store 126 for any models that have a specified level of commonality with the search criteria. Search criteria can include data schema properties and data schema property values. Search criteria can be from an existing model or for a model being created.

A specified level of commonality is configurable. The specified level of commonality can be selected to balance the number of results that are returned form a search. A level of commonality can specify how close the properties/property values of a model are to search criteria. An increased level of commonality corresponds to a specified level of commonality that is closer to the search criteria. On the other hand, an decreased level of commonality corresponds to specified level of commonality that is further form the search criteria The amount of commonality can be increased to cause a search to return fewer models, but models that are more likely to be appropriate. The amount of commonality can be decreased to cause a search to return more models, but possibly include models that are less likely to be appropriate. In some embodiments, models have the specified level of commonality with search terms when the properties of the model exactly match the search terms. An exact match may be the highest level of commonality. Other specified levels of commonality that allow some amount of variability in the matching, can be lesser levels of commonality.

Model store 126 can store a plurality of models including models 101A, 101B, and 101C. A series of two vertical periods (a vertical ellipsis) represents that other models can be stored in model store 106 before, between, and after models 101A, 101B, and 101C.

In some embodiments, models are commingled data-centric application models that include a data model for a data store and a business logic model for interacting with data entities contained in the data store. Data models can also include relationships between different parts of the data model, such as, for example, tables in an entity and hints about how an entity is to related to other entities. The business logic model is associated with an index tree of one or more business logic rules represented in the business logic model. Each business logic rule in the index tree identifies at least one data entity in the data store that is affected by the business logic rule.

Figure 1B:
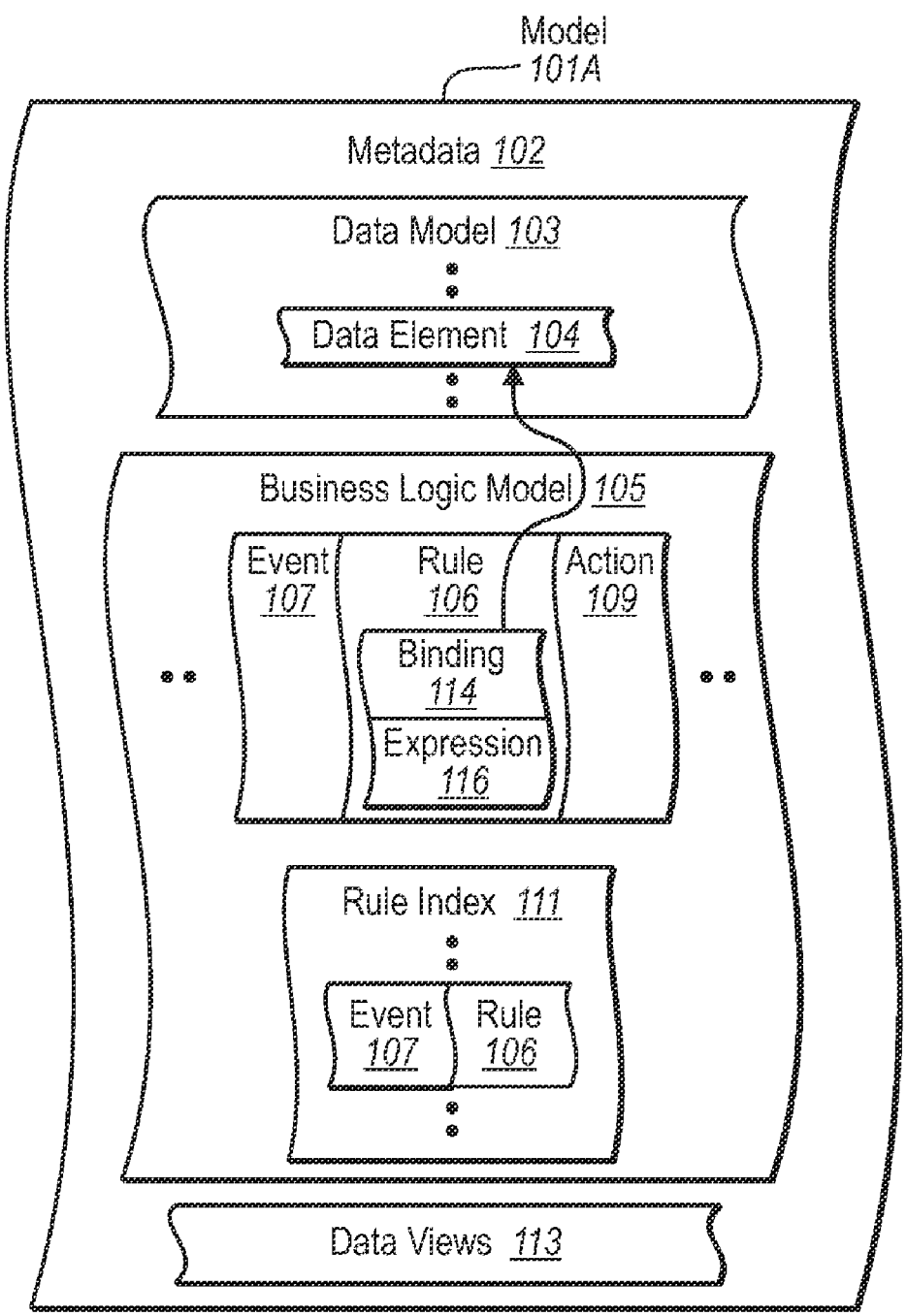
FIG. 1B illustrates an example data format for a business model.

Data-centric applications can be used to incorporate data into a form, display data in a graph or a chart, categorize and/or label different portions of the data, develop workflows based on the data, or any other data-related task. For example, commingled data models can be processed to implement workflow applications related purchasing, inventory management, manufacturing control, etc. Generally, a data store can be any data source accessible user-interface architecture 100, such as, for example, a relational database, a Web service, an infofeed, a Windows® SharePoint™ Services site or list, etc. Thus, accessed and processed data entities can vary accordingly to the type of data store. For example, data entities can include relational data (e.g., values of data fields from related data tables), services, business objects, lists, Web parts, etc FIG. 1B illustrates an example data format business model 101A. Model 101A includes data model 103, business logic model 105, and data views 113. Data model 103 can include a schema representing the data formats for tables, fields and properties of data store 117, including data element 104. Data element 104 can represent, for example, the data format of data entity 117A (e.g., a value of a data base field).

Business logic model 105 can include one or more rules including rule 106. Rules 106 includes a reference to event 107 (e.g., an input event), a condition 108 that is to be evaluated when event 107 occurs, and an action 109 that is to be implemented when condition 108 is satisfied. Condition 108 further includes binding 113 to data element 104 and expression 116.

Rules can relate to any number of different things including: data validation (rules that control software application updates), data integrity (rules that control what happens after software updates), synchronized updates, data snapshots, audits and logs, form flow, user authorization (at row, column, and action level), task flow (i.e. flow of a work process), conditional formatting that controls what users see in a form, based on data or workflow state, policies that determine allowable discretionary actions and automatic actions based on data or workflow state or other means of controlling functionality of a data-centric software application.

Rules can be of a variety of different formats. In some embodiments, a rule includes a data binding to a data entity, a constraint (e.g., an expression over the data entity), and an action. A binding might be of the format: <bindingid, friendly name, URI, [objected], filedreflelementreflrecordref>. A namespace resolver can resolve references in a binding to permit the execution engine to access data from a specified data store. When an accessed data entity (e.g., a field of a relational database) satisfies the constraint (e.g., is less than or equal to a specified value), the action is performed (e.g., allowing a purchase order to be created).

Rules can be used to implement business logic for various types of data-centric application behavior. Accordingly, a portion of business logic can include rules to guard and/or impose data quality, such as, for example, validation within the scope of a record, a view or a workflow, integrity requiring consequential actions after some data is changed, and/or synchronization updates involving copying of data from one table to another. Business logic can also include rules to conditionally format a form's user interface (UI). For example, depending on the state of the data, add, show, and/or hide elements in the form, format based on validation and/or authorization rules. Business logic can also include rules to enable navigation and filtering in a form, including cascading choices and filtered lookups, and conditionally enabling and/or showing queries and views in a form. Business logic can also include rules on form and task flow (i.e., how forms are used in sequence or in a set, based on state rules).

Furthermore, rules can be used to invoke authorization policies (e.g. row and column level policies based on user and data state), offline policies (e.g. restrictions on what can be done offline), referential integrity (e.g. ensuring there are no orphan processes, related entries are cascade deleted, etc.) and/or any other form of application behavior.

Business logic can include user-created rules. Furthermore, these rules may be propagated throughout a data-centric application. In some embodiments, business logic may be categorized in the form of declarative macros. Declarative macros, as used herein, are portions of business logic. For example, if a user creates a form for a data-centric application, part of the business logic for the form may be to highlight boxes that have not been filled out and validate the data in the boxes that have been filled out. Accordingly, a declarative macro can include instructions (e.g., XML) for the data-centric application to highlight un-filled boxes. Another declarative macro can include instructions (e.g., also XML) for the data-centric application to validate the data in filled boxes.

Declarative macros can be associated with one or more information items via one or more data organization items. Information items, for example, may include data, forms, data plus forms, form region, task, workflow, user or role.

Organization items, for example, may include forms, data structures, workflow descriptions or organization structures. Thus, in some embodiments, declarative macros may be associated with data and/or tasks, for example, via data structures and/or workflow descriptions. Accordingly, business logic can be metadata represented in XML instructions.

The following XML example, represents metadata of a declarative macro:

```
<DeclartiveMacro Type = "Validation">
    <Source>
        <Element>OrderDate</Element>
        <Element>PromiseDate</Element>
    </Source>
    <Scope>global</Scope>
    <Constraint>
        <Expression PatternType="MinimumDifference">
            <Arguments First= "DeliveryDate" Second="OrderDate"
            Difference ="5"/>
        </Expression>
        <Environment>MacroEvaluator</Environemt>
    </Constraint>
    <OnFalse>
        <Action PatternType="MinimumDifferenceDenyChange"/>
    </OnFalse>
</DeclartiveMacro>
```

Execution of the XML example representing the declarative macro insures that at a Delivery Date is at least 5 days after an Order Date otherwise entry of the a corresponding order is denied. Data within the Source Tag indicates data that is being guarded and implies the data change and forum events are relevant. The scope tag indicates that the declarative macro applies to data irrespective of whether the change happens via a particular form or through direct data update. The environment tag declares whether other modules, besides a macro evaluator, are needed to evaluate the constraint. Actions can include built in or custom actions.

Rule index 111 includes one or more entries that map events to corresponding rules. For example, entry 112 maps event 107 to rule 106.

Data views 113 includes one or more views to subsets of data from data store 117.

Each of data model 103, business logic model 105, and data views can be represented in metadata 102 such that no code is required to execute model 101A.

Accordingly, since data schema and views defining data formats and data access can also be represented in metadata, representing declarative macros in metadata, such as, for example, XML, permits the development of codeless data-centric applications. Data schema can include basic data structures representing formats for lists/tables, fields, properties of files, nested data, relationships keyed on multi-columns, enforced relationships, enforced editing, cascading deletes, etc. Generally, a view indicates a subset of data store sorted and/or displayed in a particular way. Views can include joins, such as, for example, projection of multiple columns from related lists, updates on related records or records sets, such as, for example, concurrency control of update patterns by multiple users (a lightweight check-out mechanism), reference to external data, such as, for example, binding and synching lists to external data sources. For example, binding fields of one database sources in another database. Accordingly, data-centric applications can be constructed essentially entirely in metadata significantly simplifying application design.

Returning to FIG. 1A, data modeler 123 can be configured to manipulate data models, including data models similar to data model 103. Rule modeler 124 can be configured to manipulate rules, similar to those included in business logic model 105. Accordingly, the modules of user-interface architecture 100 (including user-interface module 121, model manipulation module 122, data modeler 123 and rule modeler 124) can interoperate to identify, create, delete, modify, connect together, etc. models of business related software applications, including applications represented in commingled data-centric application models.

Figure 2:
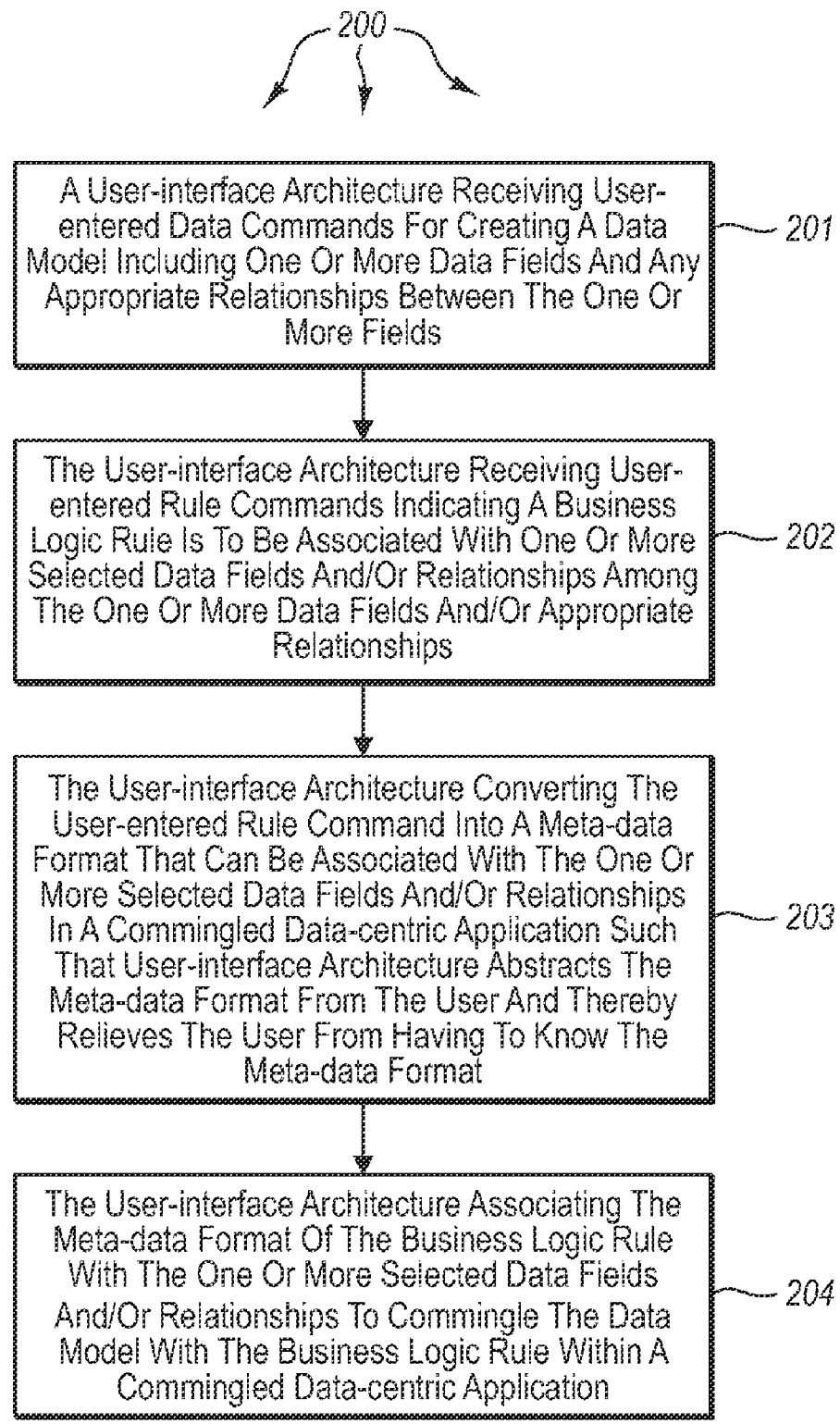
FIG. 2 illustrates a flowchart of a method for using a user-interface architecture to create a commingled data-centric application.

FIG. 2 illustrates a flowchart of a method 200 for processing a data-centric business model. Method 200 will be described with respect to the components and data depicted in user-interface architecture 100.

Method 200 includes an act of a user-interface architecture receiving user-entered data commands for creating a data model including one or more data fields and any appropriate relationships between the one or more fields (act 201). For example, user-interface module 121 can receive model creation commands 131. Method 200 includes an act of the user-interface architecture receiving user-entered rule commands indicating a business logic rule is to be associated with one or more selected data fields and/or relationships among the one or more data fields and any appropriate relationships (act 202). For example, user-interface module 121 can receive rule commands 132. Appropriate relationships between the one or more fields can include relationships between individual fields as well as between groups of fields.

Figure 5A:
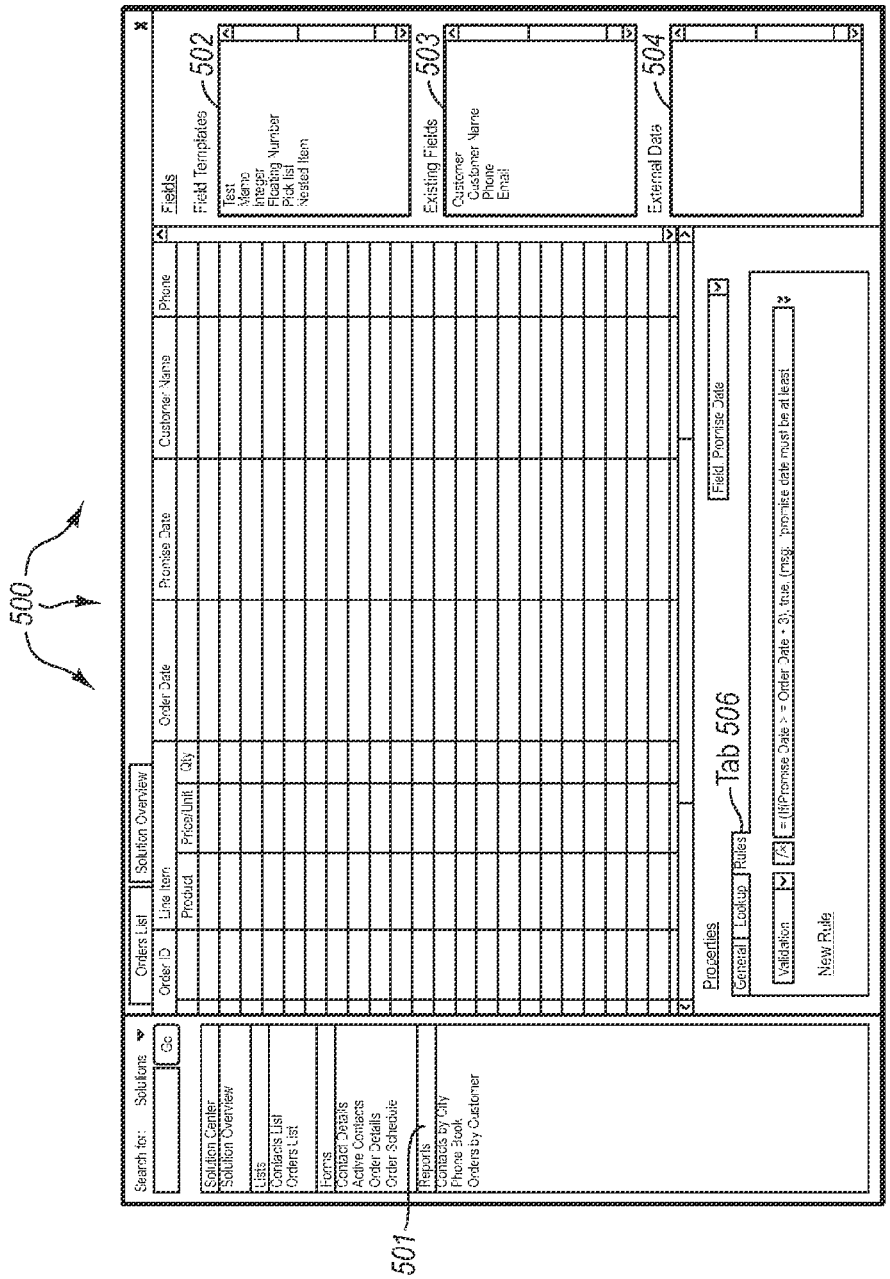
FIGS. 5A through 5C illustrate an example portion of a presented user-interface that can receive input for creating a commingled data-centric software application.
Figure 5B:
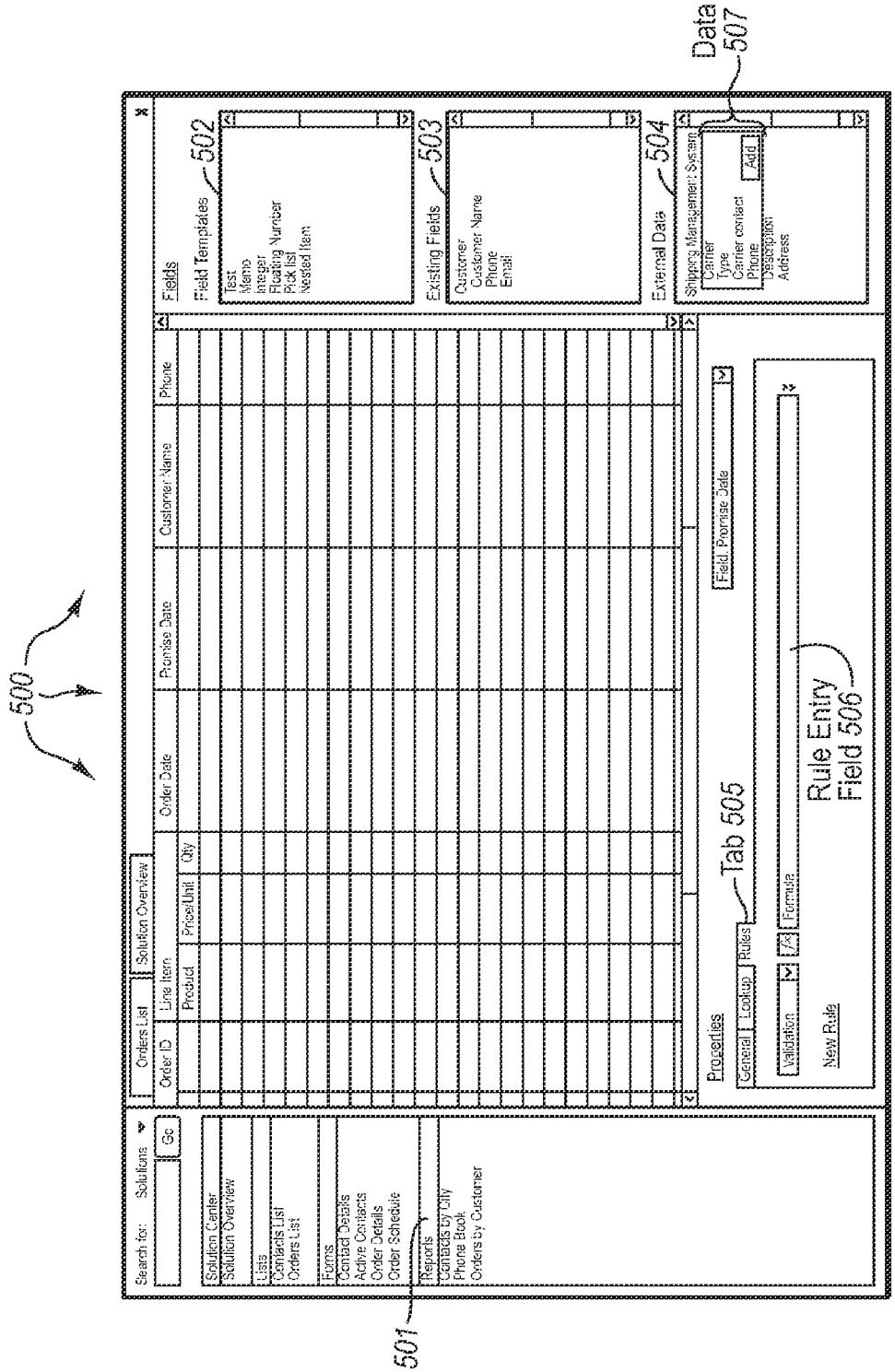
Figure 5C:
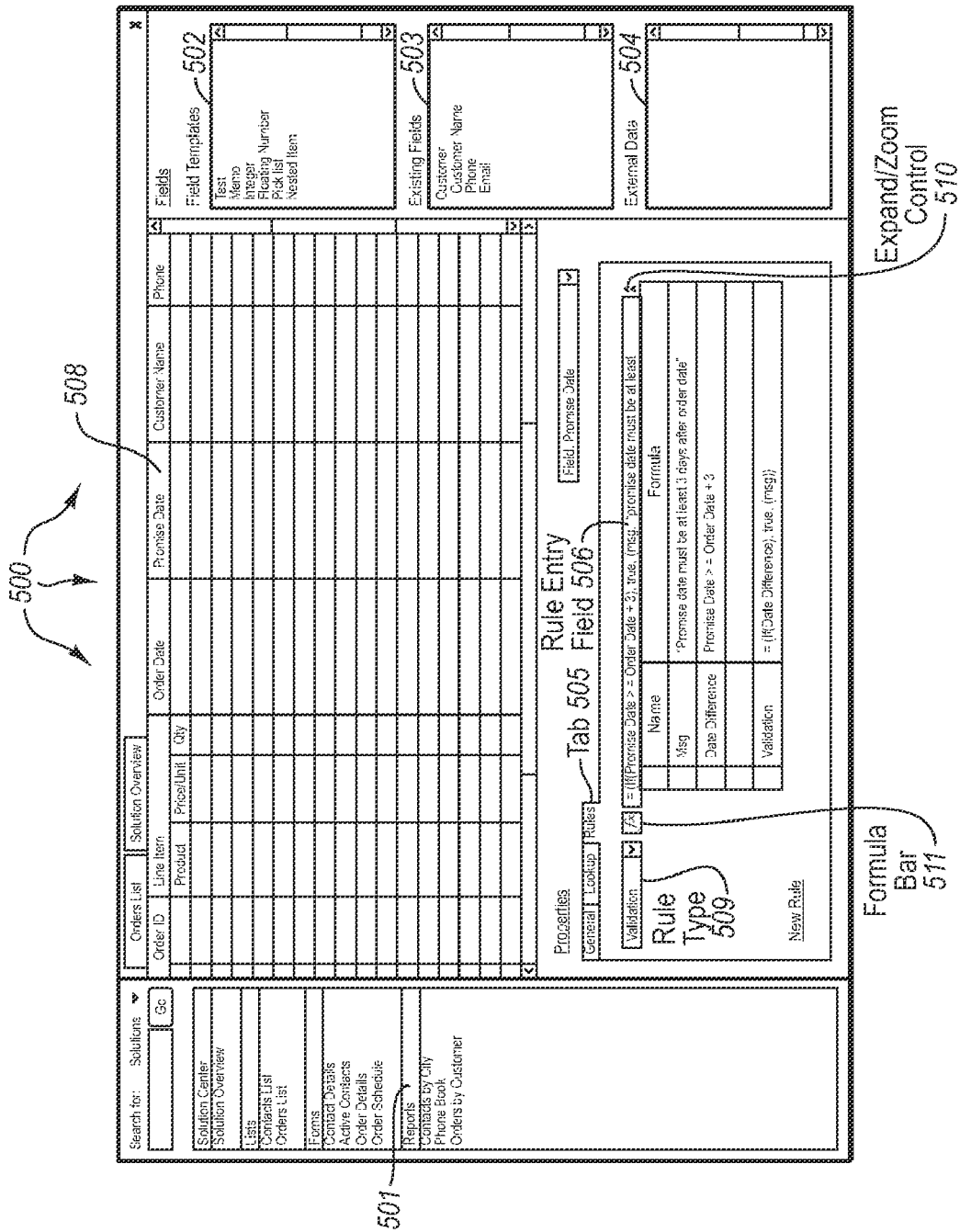

FIGS. 5A through 5C illustrate an example portion of a presented user-interface 500 that can receive input for creating a commingled data-centric software application. As depicted in FIG. 5A, a user can open up a blank solution. The user can then drag one or more fields from field templates 502 to crate a customer Order list. One of the fields is a text type field named 'Customer' and, as depicted in existing fields 503, includes customer name, phone, and email. Another field is of type <"nested list"> named 'line items' and gets a line item column that expands to show multiple sub-columns. Default views (including a master detail form for Orders and Line Items) and reports 501 are created for the user, based on the data types and the relationship implied by the nested line items.

As depicted in FIG. 5B, the user can select external data 504 to link available data 507 from a shipping management system to the custom order list. The user can enter rules at rule entry field 506. For example, referring now to FIG. 5C, the user can select promise date field 508 and then enter '=(Order Date+5)' into rule entry field 506 to create a rule that sets the promise date for an item five days later than the order date for the item.

More complex rules can also be entered. For example, the user can select promise data field 508 and validation at rule type 509. The use can then enter '=(If(Promise Date>=Order Date+3), true, (msg: "promise date must be at least 3 days after the date the order was placed"))' to insure that a promise data is at least three days after an order date. The user can select expand/zoom control 510 to get a set of rows in which smaller formula steps can be defined. Thus, the user can select a small formula and include it as a parameter in a larger formula. Rule entry field 506 can also include type ahead functionality to make filed name selection more efficient.

Other types of rules for validation, conditional formatting, form navigation, etc. can also be entered at rule entry field 506. Rule entry field 506 can be configured to receive rule input in the form of known mathematical expressions or syntax, such as, for example, that supported by other existing spreadsheet and database applications. Further, selecting formula bar 511 can bring up a list of common formulas that can be auto-entered into rule entry field 506. Accordingly, there is an increased likelihood of a user being able to appropriately enter rule input. In some embodiments, user-interface architecture includes software wizards that assist a user in rule creation and rule entry.

Method 200 includes an act the user-interface architecture converting the user-entered rule command into a meta-data format that can be associated with the one or more selected data fields and/or relationships in a commingled data-centric application such that user-interface architecture abstracts the meta-data format from the user and thereby relieves the user from having to know the meta-data format (act 203). For example, model manipulation model 122 can interoperate with rule modeler 124 to convert rule commands 132 into declarative macros that can be associated with fields identified in model creation commands 131. Thus, the interoperation of model manipulation model 122 with and rule modeler 124 abstracts the meta-data format of the declarative macros from the user and relieves the user from having to know the meta-data format of declarative macros.

Method 200 includes an act of the user-interface architecture associating the meta-data format of the business logic rule with the one or more selected data fields and/or relationships to commingle the data model with the business logic rule within a commingled data-centric application (act 204). For example, manipulation model 122 can interoperate with data modeler 123 and rule modeler 124 to associate the converted declarative macros with one or more selected fields identified in model creation input commands 131 (within model 101A). Model 101A can then be stored in model store 126 and/or presented to a user.

Figure 3:
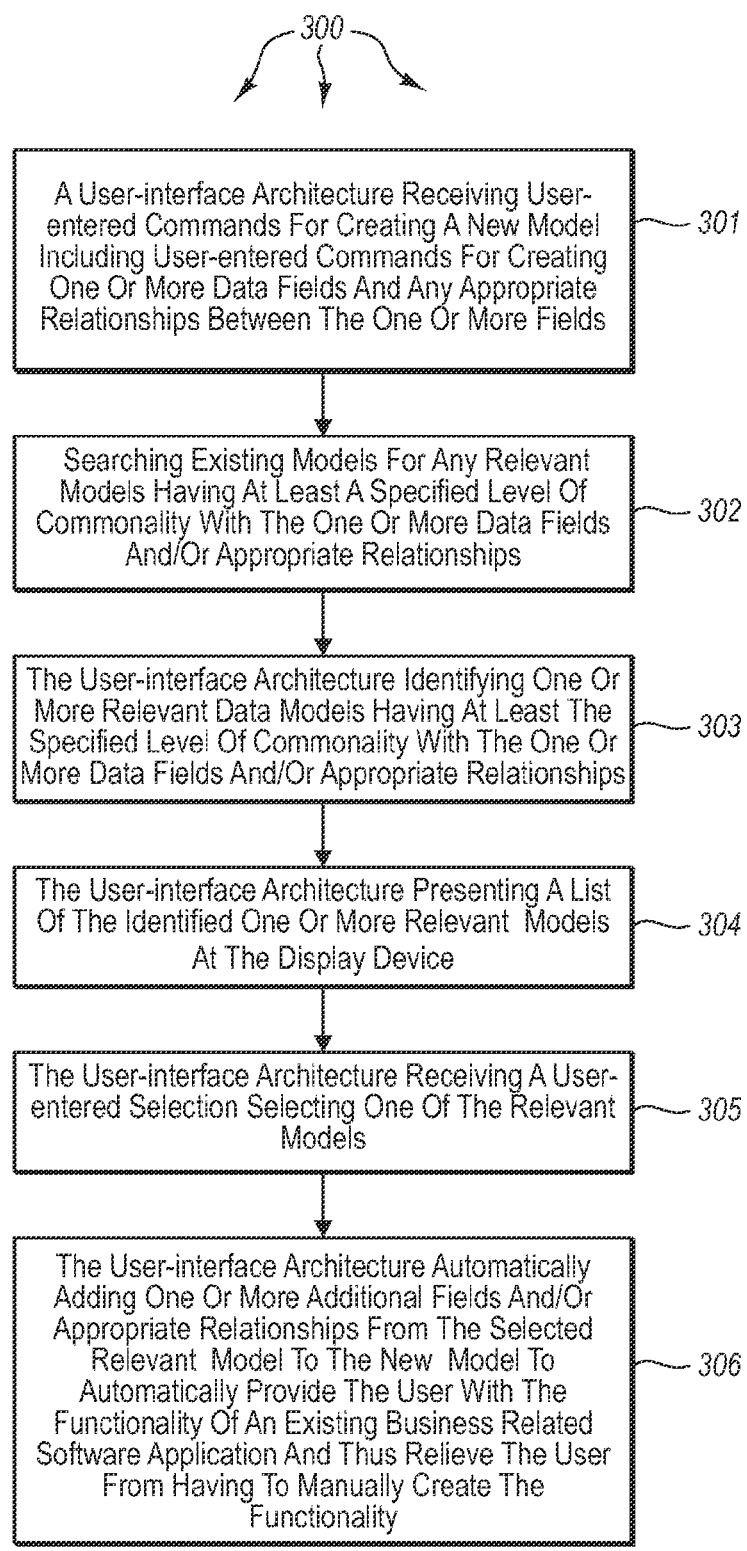
FIG. 3 illustrates a flowchart of a method for using a user-interface architecture to create a business related software application.

FIG. 3 illustrates a flowchart of a method 300 for using a user-interface architecture to create a business related software application. Method 300 will be described with respect to the components and data depicted in user-interface architecture 100.

Method 300 includes an act of a user-interface architecture receiving user-entered commands for creating a new model, including user-entered commands for creating one or more data fields and any appropriate relationships between the one or more fields (act 301). For example, user-interface module 121 can receive schema creation commands 141 including commands for creating one or more data fields. Alternately, user-interface module 121 can receive rule creation commands including commands for creating one or more business logic rules.

Method 300 includes an act of searching existing models for any relevant models having at least a specified level of commonality with the one or more data fields and/or any appropriate relationships (act 302). In some embodiments, a user-interface architecture automatically searches existing models for relevant models. For example, search module 125 can search model store 126 for any existing models having at least the specified level of commonality with the one or more created data fields indicated in schema creation commands 141. Alternately, search module 125 can search model store 126 for any existing models having at least the specified level of commonality rule properties included in received rule creation commands. In other embodiments, a user manually searches existing models for relevant models (e.g., through interfacing with user-interface module 121).

Method 300 includes an act of the user-interface architecture identifying one or more relevant models having at least the specified level of commonality with the one or more data fields and any appropriate relationships (act 303). For example, search module 125 can identify one or more models from model store 126 having at least the specified level of commonality with the one or more data fields indicated in schema creation commands 141. Alternately, search module 125 can identify one or more models from model store 126 having at least the specified level of commonality with rule properties included in received rule creation commands.

Method 300 includes an act of the user-interface architecture presenting a list of the identified one or more relevant models at the display device (act 304). For example, user-interface module 121 can present list 142 back to a user.

Figure 6A:
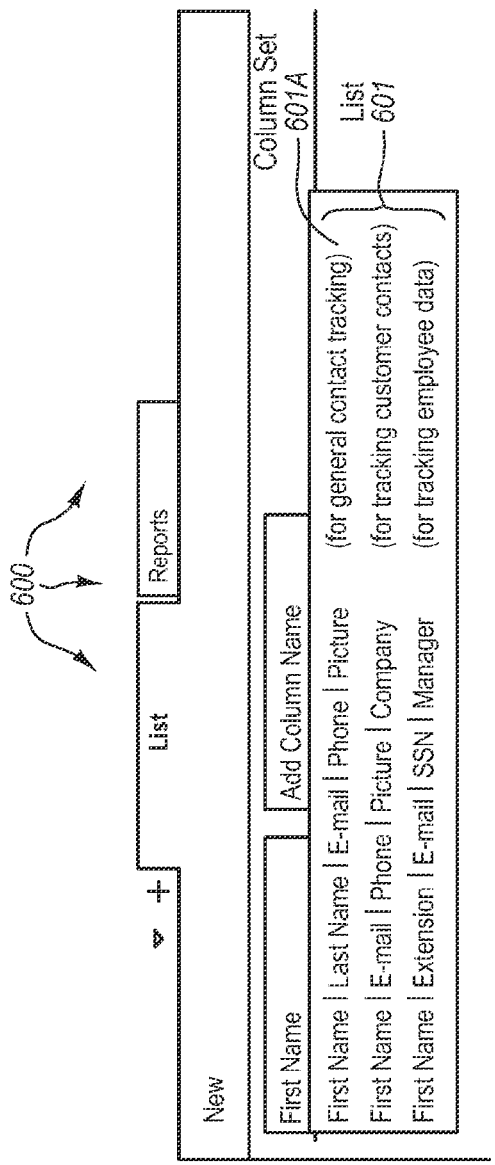
FIGS. 6A through 6C illustrate an example portion of a presented user-interface that assists a user in locating a model that corresponds to an entered model.
Figure 6B:
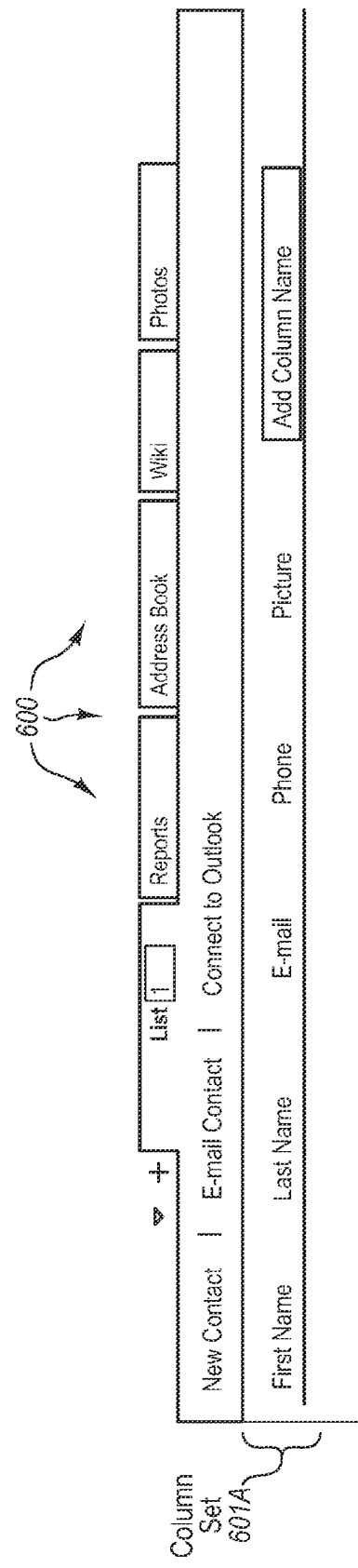
Figure 6C:
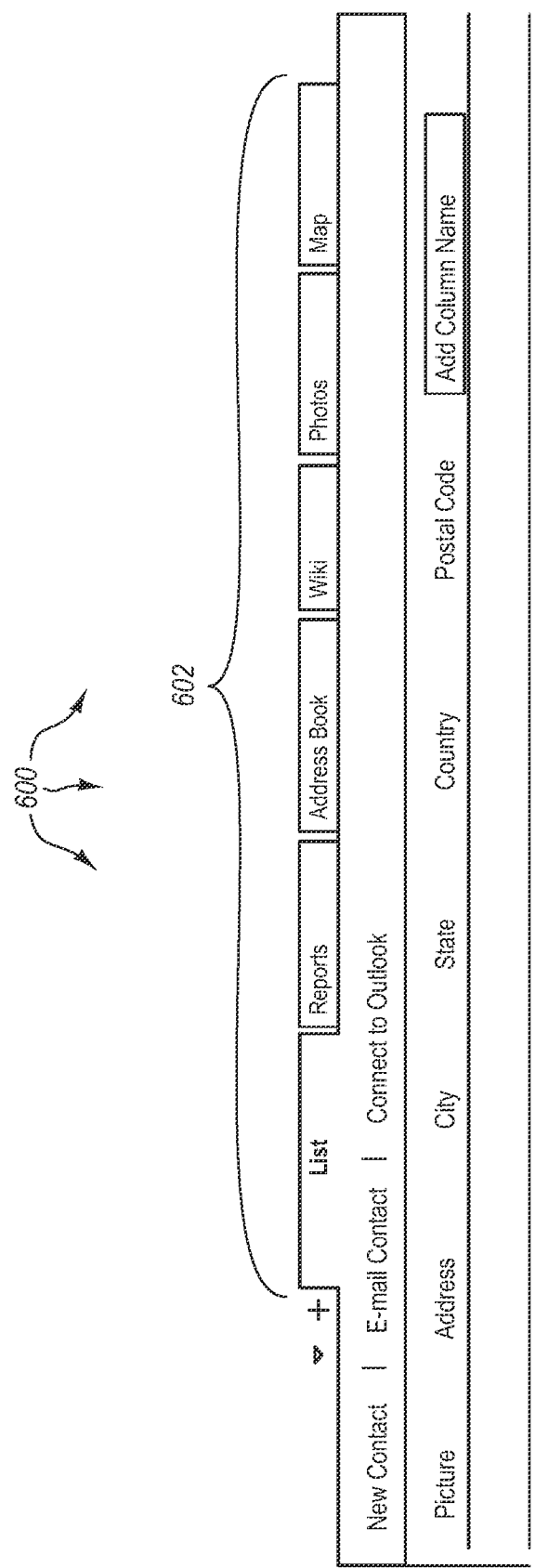

FIGS. 6A through 6C illustrate an example portion of a presented user-interface 600 that assists a user in locating a model that corresponds to an entered model. For example, in FIG. 6A, in response to creating fields for First Name and Last Name, search model 125 can search for data models that match one or more of the created fields. Models that have the specified level of commonality with First Name and/or Last Name are presented in list 601. Returned models can include different column sets for different business purposes.

Method 300 includes an act of the user-interface architecture receiving a user-entered selection selecting one of the relevant models (act 305). For example, user-interface module 121 can receive selection 143 from a user. Referring again to FIG. 6A, the user may select column set 601A.

Method 300 includes an act of the user-interface architecture automatically adding one or more additional fields and any appropriate relationships from the selected relevant model to the new model to automatically provide the user with the functionality of an existing business related software application and thus relieve the user from having to manually create the functionality (act 306). For example, model manipulation model 122 can interoperate with data modeler 123 to add one or more additional fields to from the selected model to the model indicated in schema creation commands 141. Alternately, manipulation model 122 can interoperate with rule modeler 124 to add rules from a selected model to received rule creation commands. Referring to FIG. 6B, additional columns E-mail, Phone, and Picture are added to the user-entered columns of First Name and Last Name.

Model manipulation model 122 can also interoperate with data modeler 123 to automatically generate one or more views for the columns including a single instance form, a multi instance form, reports, photo galleries, contact lists (address book), and maps. FIG. 6C depicts tabs 602 representing the different views for column set 601A.

Accordingly, embodiments of the invention facilitate the automated injection of an existing model (data fields and/or rules) into a new model creation so as to reuse existing models in the creation of new models when appropriate. The automation can permit less skilled users to create models that otherwise may not be possible. Embodiments of the present invention also assist a user in extending application functionality in an automated fashion.

Figure 4:
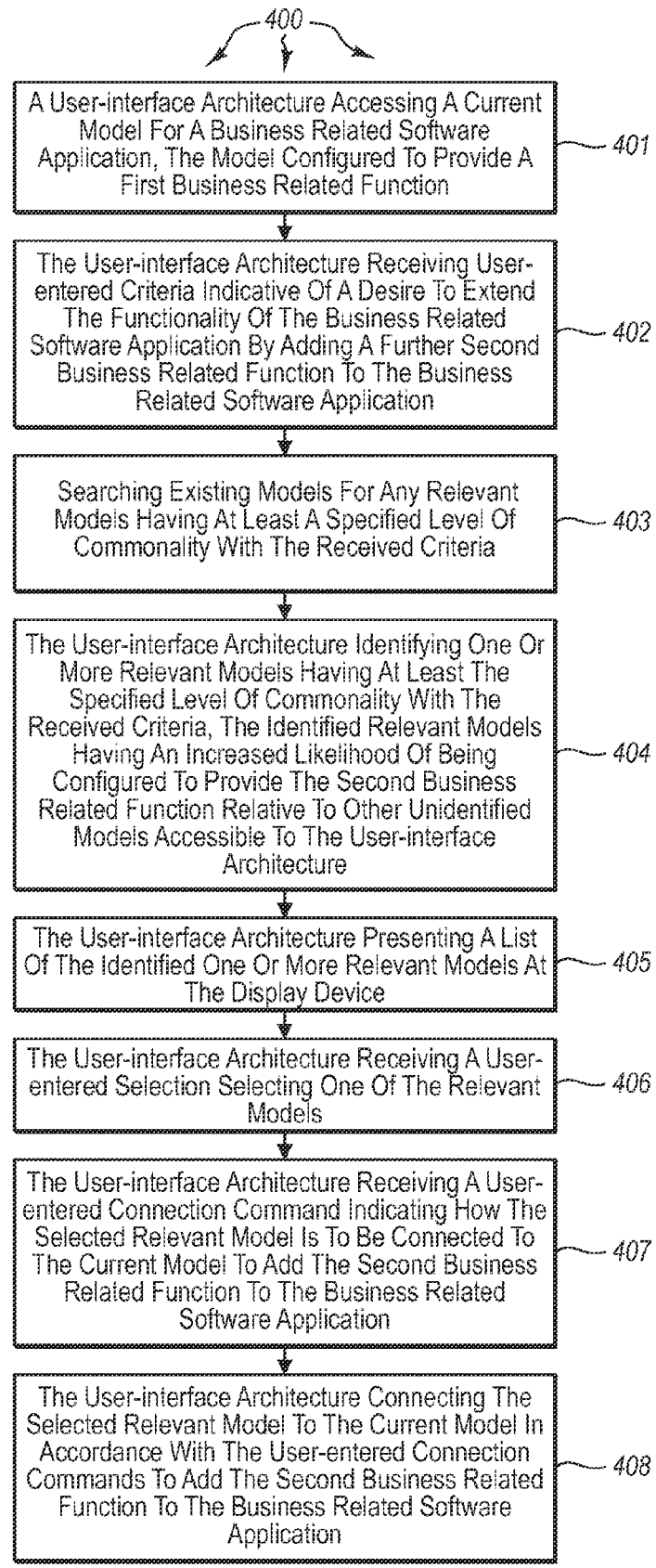
FIG. 4 illustrates a flowchart of a method for using a user-interface architecture to extend a business related software application.

FIG. 4 illustrates a flowchart of a method 400 for using a user-interface architecture to extend a business related software application. Method 400 will be described with respect to the components and data depicted in user-interface architecture 100.

Method 400 includes an act of a user-interface architecture accessing a current model for a business related software application, the model configured to provide a first business related function (act 401). For example, model manipulation model can access model 101A (including data fields and rules) configured to provide a first business related function. Method 400 includes an act of the user-interface architecture receiving user-entered criteria indicative of a desire to extend the functionality of the business related software application by adding a further second business related function to the business related software application (act 402). For example, user-interface module 121 can receive extension criteria 151 indicative of a desire to extend the functionality (e.g., data fields and/or rules) of model 101A.

Figure 7A:
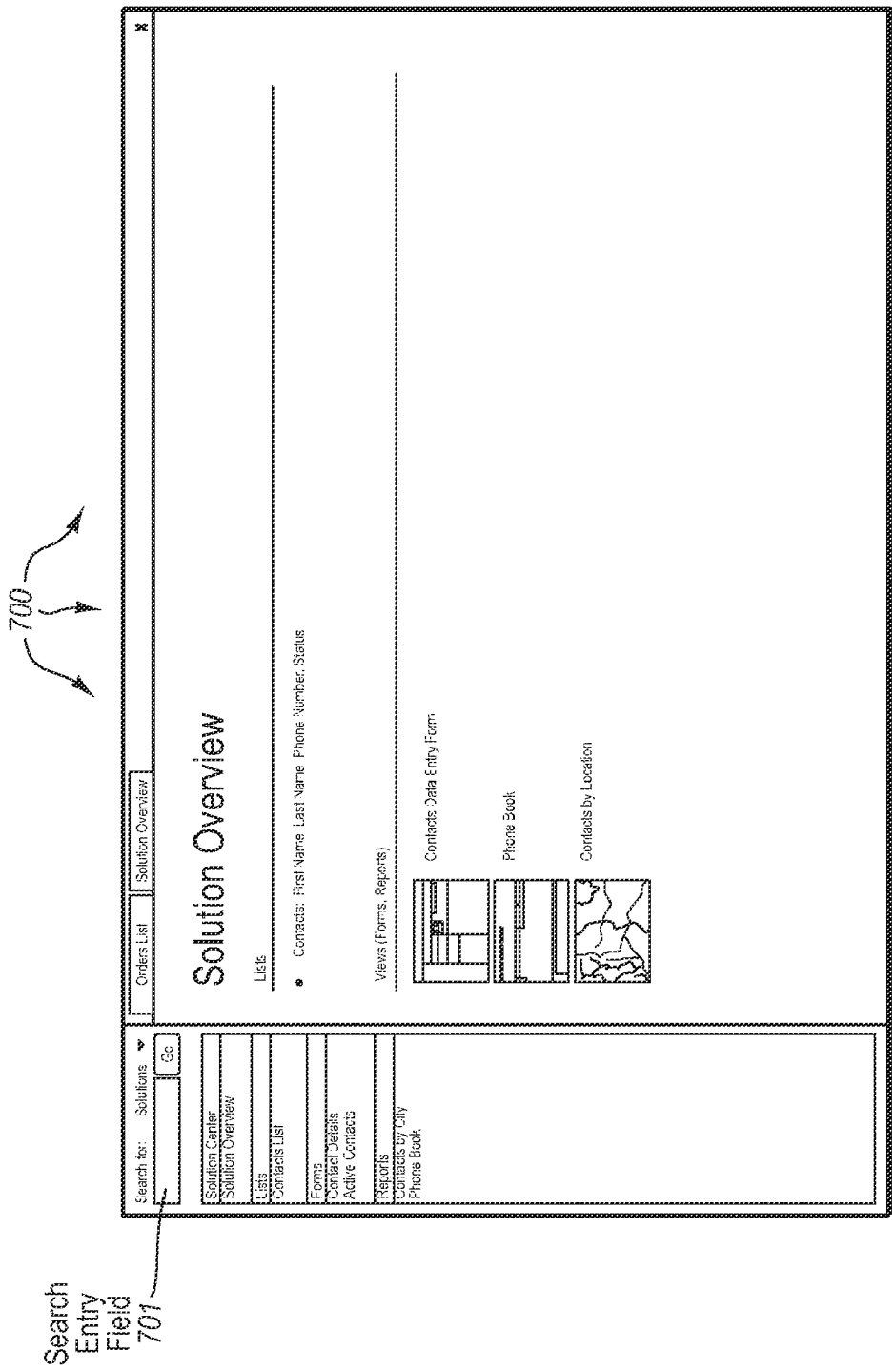
FIGS. 7A and 7B illustrate an example portion of a presented user-interface that assists a user in extending application functionality.
Figure 7B:
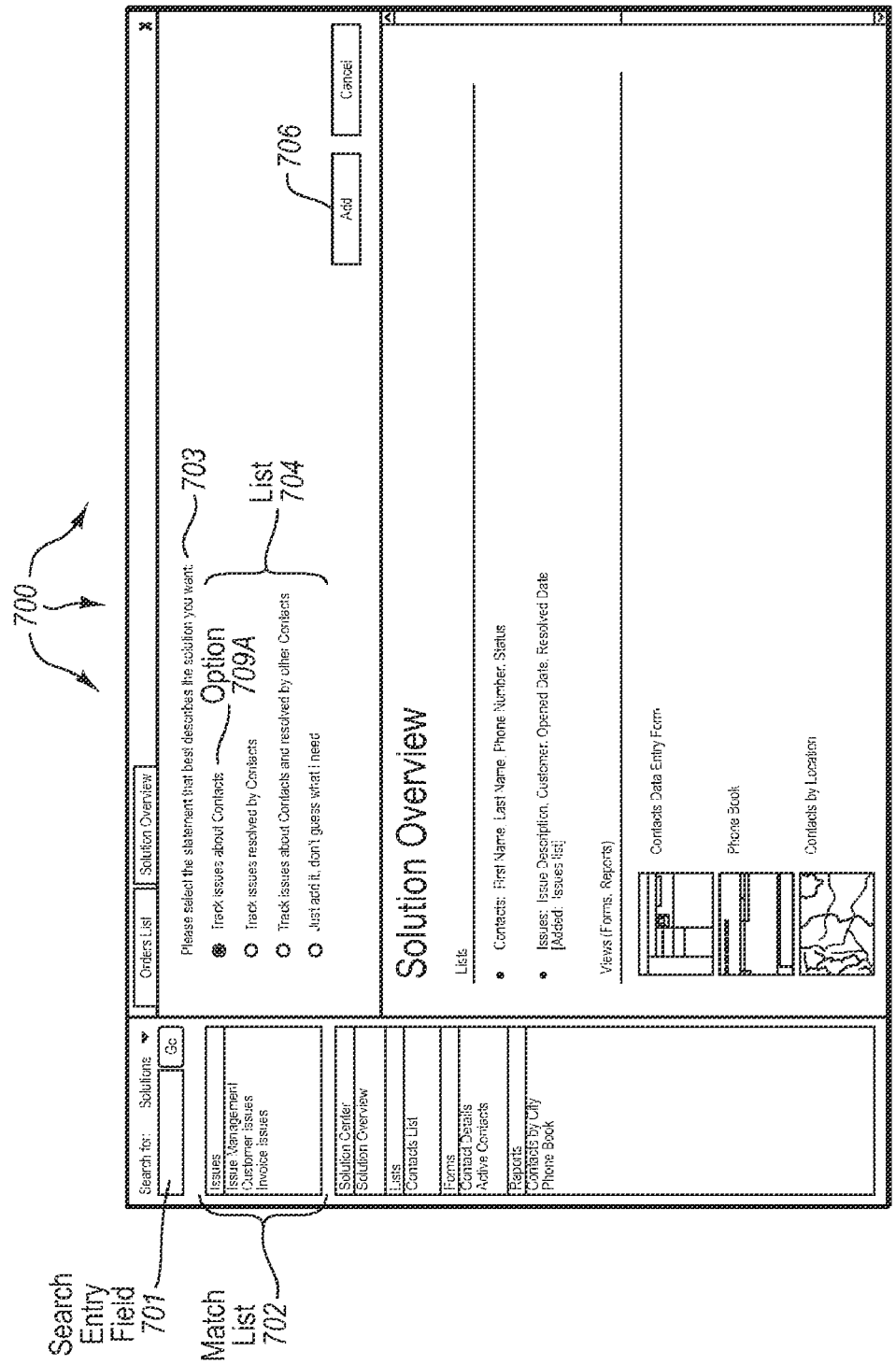

FIGS. 7A and 7B illustrate an example portion of a presented user-interface 700 that assists a user in extending application functionality. It may be that the user that selected column set 602A to track contacts desires to add issue tracking functionality to the application. However, the user may not know what fields are appropriate for tracking issues or how to add such fields to application. FIG. 7A depicts a solution overview that can assist the use in extending the application. For example, the user can enter the text "Issue" (the extension criteria) into search entry field 701.

Method 400 includes an act of searching existing models for any relevant models having at least a specified level of commonality with the received criteria (act 403). In some embodiments, a user-interface architecture automatically searches existing models for relevant models. For example, search module 125 can search model store 106 for any relevant models having at least a specified level of commonality with extension criteria 151. In other embodiments, a user manually searches existing models for relevant models (e.g., through interfacing with user-interface module 121).

Method 400 includes an act of the user-interface architecture identifying one or more relevant models having at least the specified level of commonality with the received criteria, the identified relevant models having an increased likelihood of being configured to provide the second business related function relative to other unidentified models accessible to the user-interface architecture (act 404). For example, search interface module 125 can identify models 101B and 101C as having a specified level of commonality with (e.g., indicated data fields and/or rules included in) extension criteria 151.

Method 400 includes an act of the user-interface architecture presenting a list of the identified one or more relevant models at the display device (act 405). For example, use-interface module 121 can present list 152 (including models 101B and 101C) to a user. Referring to FIG. 7B, match list 702 provides a list solutions related to "Issues", "Issue Management", "Customer Issues", and "Invoice Issues", in response to entry of "Issue" at search entry field 701.

As depicted in FIG. 7B, there are several ways in which functionality can be extended. The user selects "Issues" from match list 702 and is presented with question 703 prompting the user for more precise instructions on how existing functionality is to be extended. List 704 lists one or more possible ways to extend existing functionality. Method 400 includes an act of the user-interface architecture receiving a user-entered selection selecting one of the relevant models (act 406). For example, user-interface module 121 can receive selection 153, selecting models 101B. As depicted in FIG. 7B, Option 704A is selected from list 704.

Method 400 includes an act of the user-interface architecture receiving a user-entered connection command indicating how the selected relevant model is to be connected to the current model to add the second business related function to the business related software application (act 407). For example, user-interface 121 can receive connection command 154 indicating how model 101B is to be connected to model 101A to add the second business function. Command 154 can indicate how data fields and/or rules from model 101B are to be integrated into the data fields and/or rules of model 101A. Referring to FIG. 7B, the user can select add control 706 to indicate that issue tracking about contacts is to be added to the functionality of the existing application for column set 601A.

Method 400 includes an act of the user-interface architecture connecting the selected relevant model to the current model in accordance with the user-entered connection commands to add the second business related function to the business related software application (act 408). For example, model manipulation module 122 can interoperate with data modeler 123 and rule modeler 124 to connect (e.g., data fields and/of rules of) model 101B to (e.g., data fields and/or rules of) model 101A in accordance with connection command 154. With reference to column set 601A, model manipulation module 122 can interoperate with data modeler 123 and rule modeler 124 to add issue tracking about contacts to the application for column set 601A.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a display device and a user-interface architecture, a method for creating a commingled data-centric application, the method comprising:

an act of the user-interface architecture receiving user-entered data commands for creating a data model including at least one or more data fields;

an act of the user-interface architecture receiving user-entered rule commands indicating a business logic rule is to be associated with one or more selected data fields among the one or more data fields;

an act of the user-interface architecture converting the user-entered rule command into a meta-data format that can be associated with the one or more selected data fields in a commingled data-centric application such that user-interface architecture abstracts the meta-data format from the user and thereby relieves the user from having to know the meta-data format; and an act of the user-interface architecture associating the meta-data format of the business logic rule with the one or more selected data fields to commingle the data model with the business logic rule within a commingled data-centric application.

2. The method as recited in claim 1, wherein the act of the user-interface architecture receiving user-entered data commands for creating a data model including one or more data fields comprises an act of user-entered data commands for creating a business related software application.

3. The method as recited in claim 1, wherein the an act of the user-interface architecture receiving user-entered rule commands comprises an act of receiving user-entered rule commands indicative of a rule type selected from among data validation, data integrity, synchronized updates, data snapshots, audits and logs, form flow, user authorization, task flow, custom formatting, and conditional formatting.

4. The method as recited in claim 1, wherein the act of the user-interface architecture receiving user-entered rule commands comprises an act of receiving one or more formulas having syntax supported by an existing spreadsheet and database applications.

5. The method as recited in claim 1, wherein the act of the user-interface architecture receiving user-entered rule commands comprises an act of receiving a user-selected rule command from a wizard designed to assist users in entering rule commands.

6. The method as recited in claim 1, wherein the act of the user-interface architecture converting the user-entered rule command into a meta-data format comprises an act of converting the user-entered rule command into a declarative macro.

7. The method as recited in claim 1, wherein the act of the user-interface architecture associating the meta-data format of the business logic rule with the one or more selected data fields comprises an act of binding a declarative macro to one or more selected fields.

8. At a computer system including a display device and a user-interface architecture for manipulating business related software applications, a method for creating a business related software application, the method comprising:

an act of the user-interface architecture receiving user-entered commands for creating a new model, including user-entered commands for at least creating one or more data fields;

an act of the searching existing models for any relevant models having at least a specified level of commonality with the one or more data fields;

an act of the user-interface architecture identifying one or more relevant models having at least the specified level of commonality with the one or more data fields;

an act of the user-interface architecture presenting a list of the identified one or more relevant models at the display device;

an act of the user-interface architecture receiving a user-entered selection selecting one of the relevant models; and an act of the user-interface architecture automatically adding one or more additional fields from the selected relevant model to the new model to automatically provide the user with the functionality of an existing business related software application and thus relieve the user from having to manually create the functionality.

9. The method as recited in claim 8, wherein the act of the user-interface architecture receiving user-entered commands for creating a new model comprises an act of receiving field or entity names or rule names for creating business logic rules.

10. The method as recited in claim 9, wherein the act of searching existing models for any relevant models comprises an act of searching for models that have field names that match the received field names or for models that have business logic rules that match received business logic rule names.

11. The method as recited in claim 9, wherein the act of the user-interface architecture identifying one or more relevant models comprises an act of identifying one or more relevant models that have field names that match the received field names or identifying one or more relevant models that have rule properties matching received rule names.

12. The method as recited in claim 8, wherein the act of the user-interface architecture presenting a list of the identified one or more relevant models comprises an act of presenting a list of models, each model configured to provide different business related functionality.

13. The method as recited in claim 8, wherein the act of user-interface architecture receiving a user-entered selection selecting one of the relevant models comprises an act of selecting a commingled data-centric application.

14. The method as recited in claim 8, wherein the act of the user-interface architecture automatically adding one or more additional fields from the selected relevant model to the new model to automatically provide the user with the functionality of an existing business related software application comprises an act of adding functionality from a commingled data-centric application to the new model.

15. At a computer system including a display device and a user-interface architecture for manipulating business related software applications, a method for extending a business related software application, the method comprising:

an act of the user-interface architecture accessing a current model for a business related software application, the model configured to provide a first business related function;

an act of the user-interface architecture receiving user-entered criteria indicative of a desire to extend the functionality of the business related software application by adding a further second business related function to the business related software application;

an act of the user-interface architecture automatically searching existing models for any relevant models having at least a specified level of commonality with the received criteria;

an act of the user-interface architecture identifying one or more relevant models having at least the specified level of commonality with the received criteria, the identified relevant models having an increased likelihood of being configured to provide the second business related function relative to other unidentified models accessible to the user-interface architecture;

an act of the user-interface architecture presenting a list of the identified one or more relevant models at the display device;

an act of the user-interface architecture receiving a user-entered selection selecting one of the relevant models;

an act of the user-interface architecture receiving a user-entered connection command indicating how the selected relevant model is to be connected to the current model to add the second business related function to the business related software application; and an act of the user-interface architecture connecting the selected relevant model to the current model in accordance with the user-entered connection commands to add the second business related function to the business related software application.

16. The method as recited in claim 15, wherein the user-interface architecture receiving user-entered criteria indicative of a desire to extend the functionality of the business related software application comprises an act of receiving search terms for searching existing models.

17. The method as recited in claim 15, wherein the user-interface architecture receiving user-entered criteria indicative of a desire to extend the functionality of the business related software application comprises an act of ser-entered criteria indicative of a desire to extend the functionality of commingled data-centric application, the commingled data-centric application including one or more business logic rules.

18. The method as recited in claim 15, wherein the act of the user-interface architecture identifying one or more relevant models having at least the specified level of commonality with the received criteria comprises an act of identifying one or more relevant models that have properties matching search terms that were received at the user-interface module.

19. The method as recited in claim 15, wherein the act of the user-interface architecture receiving a user-entered connection command indicating how the selected relevant model is to be connected to the current model comprises an act of receiving a command indicating how to connect a first commingled data-centric application to a second commingled data-centric application.

20. The method as recited in claim 15, wherein the act of the user-interface architecture connecting the selected relevant model to the current model in accordance with the user-entered connection commands comprises an act of connecting a first commingled data-centric application to a second commingled data-centric application.

21. A computer-readable storage device storing computer-executable instructions which, when executed by a computing processor, implement a method for creating a commingled data-centric application at a computer system which includes a display device and a user-interface architecture, wherein the method includes:

an act of the user-interface architecture receiving user-entered data commands for creating a data model including at least one or more data fields;

an act of the user-interface architecture receiving user-entered rule commands indicating a business logic rule is to be associated with one or more selected data fields among the one or more data fields;

an act of the user-interface architecture converting the user-entered rule command into a meta-data format that can be associated with the one or more selected data fields in a commingled data-centric application such that user-interface architecture abstracts the meta-data format from the user and thereby relieves the user from having to know the meta-data format; and an act of the user-interface architecture associating the meta-data format of the business logic rule with the one or more selected data fields to commingle the data model with the business logic rule within a commingled data-centric application.

22. The computer-readable storage device of claim 21, wherein the computer-readable storage device comprises the computer system.

23. A computer-readable storage device storing computer-executable instructions which, when executed by a computing processor, implement a method for creating a business related software application by manipulating business related software applications at a computer system which includes a display device and a user-interface architecture, wherein the method includes:

an act of the user-interface architecture receiving user-entered commands for creating a new model, including user-entered commands for at least creating one or more data fields;

an act of the searching existing models for any relevant models having at least a specified level of commonality with the one or more data fields;

an act of the user-interface architecture identifying one or more relevant models having at least the specified level of commonality with the one or more data fields;

an act of the user-interface architecture presenting a list of the identified one or more relevant models at the display device;

an act of the user-interface architecture receiving a user-entered selection selecting one of the relevant models; and an act of the user-interface architecture automatically adding one or more additional fields from the selected relevant model to the new model to automatically provide the user with the functionality of an existing business related software application and thus relieve the user from having to manually create the functionality.

24. The computer-readable storage device of claim 23, wherein the computer-readable storage device comprises the computer system.

25. A computer-readable storage device storing computer-executable instructions which, when executed by a computing processor, implement a method for manipulating business related software applications at a computer system which includes a display device and a user-interface architecture, wherein the method includes:

an act of the user-interface architecture accessing a current model for a business related software application, the model configured to provide a first business related function;

an act of the user-interface architecture receiving user-entered criteria indicative of a desire to extend the functionality of the business related software application by adding a further second business related function to the business related software application;

an act of the user-interface architecture automatically searching existing models for any relevant models having at least a specified level of commonality with the received criteria;

an act of the user-interface architecture identifying one or more relevant models having at least the specified level of commonality with the received criteria, the identified relevant models having an increased likelihood of being configured to provide the second business related function relative to other unidentified models accessible to the user-interface architecture;

an act of the user-interface architecture presenting a list of the identified one or more relevant models at the display device;

an act of the user-interface architecture receiving a user-entered selection selecting one of the relevant models;

an act of the user-interface architecture receiving a user-entered connection command indicating how the selected relevant model is to be connected to the current model to add the second business related function to the business related software application; and an act of the user-interface architecture connecting the selected relevant model to the current model in accordance with the user-entered connection commands to add the second business related function to the business related software application.

26. The computer-readable storage device of claim 25, wherein the computer-readable storage device comprises the computer system.

* * * * *